Figure 1:
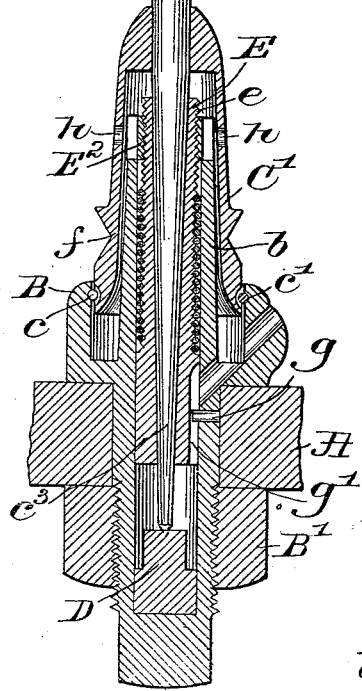

(No Model.)

G. O. DRAPER.
DEVICE FOR ADJUSTING BEARINGS OF SPINNING SPINDLES.

No. 517,270. Patented Mar. 27, 1894.

Witnesses.
Louis W. Gowell
Thomas J. Drummond

Inventor:
George O. Draper.
By Crosby Gregory
Attys.

UNITED STATES PATENT OFFICE.

GEORGE O. DRAPER, OF HOPEDALE, MASSACHUSETTS, ASSIGNOR TO GEORGE DRAPER & SONS, OF SAME PLACE.

DEVICE FOR ADJUSTING BEARINGS OF SPINNING-SPINDLES.

SPECIFICATION forming part of Letters Patent No. 517,270, dated March 27, 1894.

Application filed November 17, 1893. Serial No. 491,233. (No model.)

*To all whom it may concern:*

Be it known that I, GEORGE O. DRAPER, of Hopedale, county of Worcester, State of Massachusetts, have invented an Improvement in Devices for Adjusting Bearings of Spinning-Spindles, of which the following description, in connection with the accompanying drawings, is a specification, like letters and figures on the drawings representing like parts.

The bolster or lateral bearing used in connection with spindles having tapered pintles, is, for the best results, tapered internally to correspond substantially with the taper of the pintle of the spindle, and to provide for the requisite fit between the spindle and bearing and to maintain the same with more or less looseness, as desired, with the constant wear of the parts due to high speed, the bearing is made adjustable on or with relation to the step on which rests or moves the end of the pintle. This adjustment is usually effected by screw threads between the bearing and step, and to make this adjustment, the spindle has to be removed and a special tool inserted in the supporting-case sustaining the bearing, the tool engaging the notched upper end of the bearing, or else the bearing is entirely removed and the adjustment made by hand. In my experiments to improve this class of spindles I have surrounded the bolster near its upper end, and at the upper end of the supporting-case, with an adjusting device made movable about the bearing, so that the bearing may be adjusted accurately by engaging the said adjusting device.

I prefer to make this adjusting device in the form of a collar, the rotation of the collar moving the bearing vertically, said collar being preferably freely exposed at the upper end of the supporting-case and resting thereon, and preferably I shall notch this collar so that it may be engaged easily by a tool inserted through a hole in the sleeve of the whirl, such construction enabling the collar to be rotated and the bearing to be adjusted without removing the spindle from the bearing.

One part of my invention consists in a spindle having a tapered pintle, a lateral bearing tapered at its interior to correspond with the taper of the spindle and threaded at its exterior above the supporting-case, and means to prevent the rotation of said lateral bearing in said supporting-case, combined with a threaded collar constituting an adjusting device, the threads of the collar engaging the threads of the bearing, the collar resting upon or being sustained by the supporting-case and being free to be rotated about said lateral bearing above said supporting-case, as will be described.

In carrying out my invention, I prefer to connect the adjusting device at the upper end of the bearing with the bearing by a screw thread.

Other features of my invention will be hereinafter described and pointed out in the claims at the end of the specification.

Figure 2:
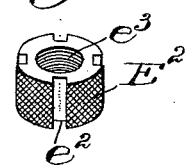
Figure 3:
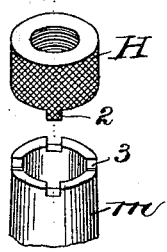

Figure 1 represents in section a spindle bearing, and a sleeve whirl spindle, together with part of a spindle rail. Fig. 2 shows the collar represented in Fig. 1, as detached; and Fig. 3 is a modification to be referred to.

Referring to the drawings, A, represents a spindle rail, and B a supporting-case confined thereon by a suitable nut, as B', said supporting-case having an upright tubular portion $b$ which receives in it the bearings and step to be described. The spindle C has a sleeve whirl C' which surrounds the sleeve-like portion of the supporting-case, said sleeve, in this present instance of my invention, having an extension below its band-receiving portion, which extension is grooved for the reception of the spindle-retaining device $c$, shown as a wire, to co-operate with a notch or seat $c'$ made as a groove in the interior of the outer wall of the supporting-case. The sleeve whirl spindle and its retaining device are substantially as in United States Patent No. 508,235, dated November 7, 1893. The supporting-case has, in this instance of my invention, a step D, upon which rests the lower end of the tapered pintle $c^3$ of the spindle. The lateral bearing E, or, as it is sometimes called, bolster, is represented as tapered at its interior to correspond substantially with the taper of the pintle $c^3$.

As I have herein chosen to represent my invention, the bearing E is shown as threaded externally, as at $e$, to receive the adjusting device $E^2$, shown as a collar notched externally, as at $e^2$, and threaded internally, as at $e^3$, the threads of the collar engaging the threads at the upper end of the bolster, the collar resting upon the upper end of the supporting-case. In this way it will be seen that by rotating the adjusting device or collar about or with relation to the upper end of the bearing, the bearing itself may be adjusted vertically to insure the proper fit or looseness between the pintle of the spindle and the bearing to compensate for any wear between the parts. The screw threads about the bolster may also be utilized for retaining in position a strand of material, preferably textile material, as represented at $f$, said strands of material constituting a packing, said packing occupying a position, however, entirely within the supporting-case. I have shown the bearing as being restrained from rotation with the casing by means of a projection $g$ carried by the supporting-case, said projection entering a slot or notch $g'$ in the bearing. I have shown the whirl as provided with openings $h$ above the top of the supporting-case and opposite the adjusting device $E^2$, and if it is desired to raise or lower the bearing E without removing the spindle, then the operator may readily insert a little rod or tool through one of the holes $h$ into one of the notches $e^2$, and by turning the spindle, cause the wire or tool engaging the collar to rotate the same, and thus adjust the bearing. If desired, however, the spindle may be removed as usual and the collar be engaged by hand and rotated to thus effect the vertical adjustment of the lateral bearing.

In my invention the adjusting device is sustained at the upper end of the supporting-case, and is movable on or about the upper end of the non-rotating bearing E.

While I prefer to make the connection between the adjusting device and the bolster, by screw threads, yet this invention is not limited to the exact form of connection shown, for prior to my invention I am not aware that any adjusting device has ever been carried at the upper end of the bearing and thus left exposed for ready access, and my invention includes any equivalent connection with the upper end of the bearing to effect the vertical adjustment of the bearing.

I may, if desired, provide the adjusting device with a lug, as for instance, in Fig. 3, where I have designated the adjusting device by the letter H, and have provided it with a projection 2 to enter a notch 3 which may be made in the upper end of the tubular portion of the supporting-case, which portion I have designated by the letter $m$.

The projection 2 referred to serves as a lock for the adjusting device, so that it cannot possibly work around or loosen, and can be moved only when engaged and turned positively.

Having described my invention, what I claim, and desire to secure by Letters Patent, is—

1. A sleeve whirl spindle having a tapered pintle, a supporting-case to enter the space between said pintle and sleeve whirl to a point above the line of band pull, combined with a lateral bearing located in said supporting-case and tapered internally to fit the taper of said pintle, and a threaded collar engaging the upper end of said bearing and sustained upon the upper portion of the supporting-case, the relative rotation of the bearing and collar providing for the vertical adjustment of the bearing within said supporting-case, substantially as described.

2. A spindle having a tapered pintle, and having an attached sleeve whirl provided with a hole, as $h$; a supporting-case; a lateral bearing tapered internally and provided externally with screw threads, combined with a bearing adjusting device having a screw thread to engage the threads at the upper end of the bearing, said adjusting device being notched to receive a stud inserted through the holes of the whirl, substantially as described.

3. A spindle having a tapered pintle; a lateral bearing tapered at its interior to correspond with the taper of the spindle, and threaded at its exterior above the supporting-case; and means to prevent the rotation of the lateral bearing in the supporting-case, combined with a threaded collar constituting an adjusting device, the threads of the collar engaging the threads of the bearing, the collar resting upon or being sustained by the supporting-case and being free to be rotated about the lateral bearing above the supporting-case, to operate, substantially as described.

4. A spindle having a tapered pintle; a lateral bearing tapered at its interior to correspond with the taper of the spindle, and threaded at its exterior above the supporting-case; and means to prevent the rotation of the lateral bearing in the supporting-case, combined with a threaded collar constituting an adjusting device, the threads of the collar engaging the threads of the bearing, the collar resting upon or being sustained by the supporting-case and being free to be rotated about the lateral bearing above the supporting-case, and with a step for the spindle, substantially as described.

5. A spindle, a supporting-case, a bolster for the spindle having an exterior screw thread and fitting loosely in the supporting tube, and a screw threaded collar engaging the bolster and suspending it from the top of the supporting-case, substantially as described.

6. A spindle, a supporting-case, a bolster for the spindle having an exterior screw thread and fitting loosely in the supporting-tube, and a screw threaded collar engaging the bolster and suspending it from the top of the supporting-case, and with packing wound in the threads, substantially as described.

7. A spindle having a tapered pintle, a bolster tapered internally to fit the pintle, a step in the supporting-case independent of the bolster, and a collar adjustably attached to the bolster which suspends it on or in the supporting-case above the step, substantially as described.

In testimony whereof I have signed my name to this specification in the presence of two subscribing witnesses.

GEORGE O. DRAPER.

Witnesses:
FREDERICK L. EMERY,
M. J. SHERIDAN.